United States Patent [19]
Fujino et al.

[11] 3,870,694
[45] Mar. 11, 1975

[54] PEPTIDE SYNTHESIS WITH N-HYDROXY-5-NORBORNENE-2,3-DICARBOXIMIDE

[75] Inventors: Masahiko Fujino, Hyogo; Shigeru Kobayashi, Osaka; Mikihiko Obayashi, Osaka; Susumu Shinagawa, Osaka; Tsunehiko Fukuda, Osaka, all of Japan

[73] Assignee: Takeda Chemical Industries, Ltd., Osaka, Japan

[22] Filed: Mar. 13, 1973

[21] Appl. No.: 340,893

[30] Foreign Application Priority Data
Mar. 14, 1972 Japan.............................. 47-26467
Mar. 21, 1972 Japan.............................. 47-28740
Mar. 21, 1972 Japan.............................. 47-28741

[52] U.S. Cl. ............................................ 260/112.5
[51] Int. Cl....................... C07c 103/52, C08h 1/00
[58] Field of Search ................................ 260/112.5

[56] References Cited
OTHER PUBLICATIONS
Furdik et al.: Chem. Abstr. 71: 101385a (1969).

*Primary Examiner*—Lewis Gotts
*Assistant Examiner*—Reginald J. Suyat
*Attorney, Agent, or Firm*—Wenderoth, Lind & Ponack

[57] ABSTRACT

The present invention relates to an improvement in a method for producing a peptide which comprises allowing an amino acid or peptide whose N-terminal amino or imino group has been protected to react with an N-hydroximide compound in the presence of a carbodiimide reagent to produce an N-hydroximide ester of an amino acid or peptide whose N-terminal group is protected and allowing thus produced N-hydroximide ester to react with an amino acid, peptide or derivative thereof whose N-terminal amino or imino group is free and optionally liberating the protected peptide into the free form, the improvement wherein the N-hydroximide compound is N-hydroxy-5-norbornene-2,3-dicarboximide.

5 Claims, No Drawings

PEPTIDE SYNTHESIS WITH N-HYDROXY-5-NORBORNENE-2,3-DICARBOXIMIDE

PROCESS FOR PRODUCING PEPTIDES

The present invention relates to an improved method for the production of various peptides. It has hitherto been known that a peptide is produced by allowing an amino acid or peptide whose N-terminal amino or imino group has been protected to react with an N-hydroximide compound in the presence of a carbadiimide reagent to produce an N-hydroximide ester of an amino acid or peptide whose N-terminal group is protected and allowing thus produced N-hydroximide ester to react with an amino acid, peptide or derivative thereof whose N-terminal amino or imino (the "amino or imino group" is hereinafter simply referred to as "amino group") is free and optionally liberating the product, i.e., the protected peptide into the free form.

It has been believed among peptide chemists that the preferred N-hydroximide compounds employed in the peptide formation are N-hydroxyphthalimide and N-hydroxysuccinimide.

Nefkens et al., reported the peptide synthesis using N-hydroxyphthalimide. However, N-hydroxyphthalimide has a serious drawback in causing the racemization in the peptide formation reaction. Further, it is a disadvantage of N-hydroxysuccinimide that N-hydroxysuccinimide is hardly soluble in solvents and this imposes a limitation of its use and utility.

Subsequently, F. Weygand et al reported the process employing N-hydroxysuccinimide (Z. Naturf., 216, 426–428(1966) ]. It is to be noted that the tendency toward racemization can be diminished and the by-production of N-acylurea is avoided by the process. This feature of N-hydroxysuccinimide made the process using N-hydroxysuccinimide the most important of all the known processes for the peptide synthesis.

However, it has recently been pointed out that the use of N-hydroxysuccinimide gives rise to the unfavorable by-production of succinimidoxycarbonyl-$\beta$-alanine-N-hydroxysuccinimide ester, which disturbs the desired peptide formation reaction (Tetrahedron Letters, 24, pages 6,935 to 6,939).

The present inventors have made an extensive study to obviate the advantages of these known processes. They have succeeded in synthesizing the novel N-hydroxy-5-norbornene-2,3-dicarboximide esters of amino acids and peptides whose N-terminal amino group has been protected and have found that thus produced N-hydroxy-5-norbornene-2,3-dicarboximide esters are highly reactive to amino acids or peptides whose N-terminal amino group is free. The present inventors have also unexpectedly found that all of said shortcomings of hitherto known processes are obviated at the same time.

Therefore, it is the main object of the present invention to provide an improved process of producing peptides wherein the racemization does not substantially occurred.

Another object of the present invention is to provide an improved process which enables to produce peptides without inviting the formation of the undesired $\beta$-alanine type by-product.

The improved process of the present invention is made into practice by allowing an amino acid or peptide whose N-terminal group has been protected to react with N-hydroxy-5-norbornene-2,3-dicarboximide in the presence of a carbodiimide reagent to produce an N-hydroxy-5-norbornene-2,3-dicarboximide ester of an amino acid or peptide whose N-terminal group is protected and allowing thus produced N-hydroxy-5-norbornene-2,3-dicarboximide ester to react with an amino acid or peptide or derivative thereof of which N-terminal amino group is free and optionally liberating the protected peptide into the free form.

Amino acid referred to above as an amino acid whose N-terminal amino group has been protected may be any amino acid that has been used in conventional processes. In other words, one may employ any and all compounds that contain at least one amino group and one carboxyl group in the molecule and even when amino acids have asymmetrical carbon atoms, all the optical isomers can be employed. Further, such amino acids may be either basic, neutral or acid. Moreover, not only $\alpha$-amino acids but $\beta$-amino acids and $\gamma$-amino acids may be utilized. One may further employ the amino acids which can only be obtained by synthetic or semi-synthetic routes, such as D-phenylglycine, $\alpha$-methylalanine, $\beta$-chloroalanine, cyclohexylalanine, D-cyclohexylglycine and the like.

As to the peptide as referred to above as a peptide whose N-terminal amino group has been protected, any peptide that has heretofore been used in conventional processes may be conveniently utilized. It follows, then, that all the compounds that will be obtained as the above-mentioned amino acids form one or more peptide bonds between the same or different amino acids can be conveniently employed.

If such an amino acid or peptide is treated by one of the conventional procedurers to protect at least its N-terminal amino group, the above-mentioned amino acid or peptide whose N-terminal amino group has been protected will be obtained. These procedures have been well established and can be successfully utilized in the practice of this invention. The protective groups for the N-terminal amino group include, for example, carbobenzoxy, t-butyloxycarbonyl, t-amyloxycarbonyl, p-methoxybenzyloxycarbonyl, o-nitrophenylsulfenyl, isobornyloxycarbonyl and so forth.

The N-terminal amino group may be protected by the formation of the intramolecular acylation with the carboxyl group in the molecule. Therefore, it is to be understood that the N-terminal amino group of pyroglutamic acid is protected not by the use of protecting agent but by the intramolecular acylation.

The reaction between an amino acid or peptide whose N-terminal amino group has been protected and N-hydroxy-5-norbornene-2,3-carboximide in the presence of a carbodiimide reagent can be carried out in accordance with the procedures of the known process employing N-hydroxysuccinimide. The carbodiimide reagents may be compounds which are routinely employed by peptide chemists, such as dicyclohexylcarbodiimide, diisopropylcarbodiimide and water-soluble carbodiimides, e.g., N-cyclohexyl-N-[$\beta$-(N-methylmorpholinium-ethyl]-carbodiimide-p-toluene-sulfonate, etc. In this connection, the molar ratio of N-hydroxy-5-norbornene-2,3-dicarboximide to the amino acid or peptide whose N-terminal amino acid has been protected is usually about (1 to 2):1 and, preferably, about (1 to 1.4):1. The proportion of the carbodiimide reagent is usually about 1 to 2 moles to each mole of N-terminal-protected amino acid or peptide. The reaction leading to the formation of such an ester is usually conducted at about −20°C to about 40°C, preferably at −10° to 30°C. Reaction solvents suited to this reaction include tetrahydrofuran, ethyl acetate, dioxane, acetonitrile, chloroform, dichloromethane, dichloroethane, dimethylformamide, etc., as well as their mixtures. Generally, the reaction goes to completion within 1 to 6 hours. After the reaction has been completed, the N-hydroxy-5-norbornene-2,3-dicarboximide ester of an N-terminal protected amino acid or peptide whose N-terminal amino group is protected can be isolated by a suitable means which is conventional per se, such as concentration, phasic transfer, crystallization, recrystallization, etc. However, the reaction product mixture may be directly subjected to the next peptide-forming reaction bypassing the ester-isolation step.

The reaction between N-hydroxy-5-norbornene-2,3-dicarboximide ester of an amino acid or peptide whose N-terminal amino group is protected and an amino acid or peptide or a derivative thereof whose N-terminal amino group is free can be carried out in accordance with the procedures of the known method employing N-hydroxysuccinimide as the N-hydroximide compound.

The amino acid or peptide whose N-terminal amino group is free, which is to be reacted with the above N-hydroxy-5-norbornene-2,3-dicarboximide ester of an amino acid or peptide whose N-terminal amino acid is protected, may be selected from among the amino acids and peptides described hereinbefore. As regards the derivatives of amino acids or peptides, the N-terminal amino group of which is free, one may employ any compounds that are obtainable by introducing into amino acids or peptides substituents that will not hinder the reaction. Preferred examples are the corresponding salts, amides and the like.

It is one of the advantages of this invention that, as to said salts, one may employ the salts which are selectively soluble in aqueous solvents alone such as the salts of an amino acid or peptide with inorganic or organic bases (for example, the salts of sodium, potassium, magnesium, calcium, triethylamine, tributylamine, N-methylmorpholine, N-ethyl-morepholine, trimethylamine, N-methylpiperazine, dicyclohexylamine, etc.).

The amides mentioned above may be the amides which are obtainable upon condensation of the carboxyl group of an amino acid or peptide with ammonia, as well as the corresponding primary or secondary amides.

All amino acids and peptide compounds which are added to the reaction system, that is to say, amino acid or peptide whose N-terminal amino group has been protected as well as amino acid, peptide or derivative thereof whose N-terminal amino acid is free, may contain functional groups in their side chains, as $\epsilon$-amino in lysine, guanidino in arginine, $\gamma$-carboxyl in glutamic acid, carboxyl, thiol, hydroxy, etc., in addition to the N-terminal amino group and the C-terminal carboxyl group, and some or all of these functional groups are desirably protected. In this connection, the N-terminal amino group of said N-terminal protected amino acid or peptide has already been protected. The C-terminal carboxyl group of the amino acid or peptide whose N-terminal amino group is free, which is to be reacted with the above N-protected amino acid or peptide, may be protected. As regards the protective groups, much has already been elucidated for each functional group to be protected and the findings so far made available may be utilized in the practice of this invention. Some typical protective groups for the N-terminal amino group have been mentioned hereinbefore. As to the protective groups suited to other amino groups, such substituent groups as carbobenzoxy, t-amyloxycarbonyl, t-butyloxycarbonyl, isobornyloxycarbonyl, o-nitrophenylsulfinyl, p-nitrocarbobenzoxy, p-chlorocarbobenzoxy, p-methoxycarbobenzoxy, formyl, diphenylmethyloxycarbonyl, etc. are usually employed. As regards the protectove groups for carboxyl, one may of course employ such common ester-forming groups as methyl, ethyl, butyl, t-butyl, benzyl, p-methoxybenzyl, t-amyl, phenyl, p-nitrobenzyl, etc. Aside from the above groups, some polymeric resins, such as poly-(hydroxymethylstyrol), may be used as protective groups. Among protective groups for thiol are such thioetherforming groups as benzyl, p-methoxybenzyl, etc. and such thiocarbonyl-forming groups as benzoyl, t-butyloxycarbonyl, carbobenzoxy, etc. As to the protective groups for hydroxyl, the ethers of benzyl and t-butyl are commonly utilized, though O-acyl groups such as acetyl, benzoyl, etc., are also employed in certain instances. Protective groups for the $\omega$ guanidine group of arginine include not only carbobenzoxy and isobornyloxycarbonyl but also nitro and tosyl.

To each mole of the N-hydroxy-5-norbornene-2,3-dicarboximide ester of an amino acid or peptide whose N-terminal amino acid has been protected, it is generally sufficient to employ about one mole of an amino acid or peptide or a reactive derivative, the N-terminal amino group of which is free, though the ratio may be either increased or decreased as desired.

Generally the reaction may be carried out in a suitable solvent which is commonly used by peptide chemists. Thus, one may employ, among others, water, ether, ethyl, ethyl acetate, acetones, dioxane, tetrahydrofuran, chloroform, dichloromethane, dichloroethane, carbon tetrachloride dimethyl acetamide, dimethylformamide, pyridine, dimethylsulfoxide, phosphoric acid tris(diethyl)amide, acetonitrile, N-methylpyrrolidone, etc., as well as mixtures of such solvents. The reaction temperature is usually in the range of about −20°C to about 50°C and, for better results, about −5°to 30°C. The reaction time is usually in a range from 30 min. to 2 days After the reaction has been completed, if the produced peptide is sparingly soluble in water, it is of course advantageous to precipitate the product by diluting the reaction mixture with water or by means of adding dilute aqueous ammonia, a dilute aqueous solution of sodium hydrogen carbonate or an aqueous solution of potassium bicarbonate. When the product peptide is sparingly soluble in organic solvents, one may advantageously precipitate the protected peptide by adding a solvent such as ethyl acetate, alcohol, acetone, chloroform or the like. However, the product may be subjected to the next reaction without isolation. The N-hydroxy-5-norbornene-2,3-dicarboximide can be reclaimed from the solution.

In conducting the present invention, one may of course charge a single reactor with all the materials, i.e., an amino acid or peptide whose N-terminal amino group has been protected, N-hydroxy-5-norbornene-2,3-carboximide, a carbodiimide reagent and an amino acid or peptide or derivative thereof whose N-terminal amino group is free. In this case also firstly the amino acid or peptide whose N-terminal amino group is protected reacts with N-hydroxy-5-norbornene-2,3-dicarboximide by the aid of the carbodiimide reagent and then thus produced N-hydroxy-5-norbornene-2,3-dicarboximide ester of amino acid or peptide whose N-terminal amino group is protected reacts with an amino acid, peptide or derivative thereof whose N-terminal amino group is free. In this procedure, the peptide formation reaction is conducted in one shot process. The proportions of the reagents is selected in accordance with the above description, and the reaction time, the reaction temperature and the means for isolating the product compound may be the same as those described above.

As apparent from the above description, the reaction product peptide usually contains in the molecule one or more of protecting groups which have been used for protecting the functional groups, e.g., amino, carboxyl, hydroxy, thiol, etc. If desired, the protected peptide may be liberated into the free form by removing one or more of the protecting groups. Hitherto, the techniques or procedures for removing the protecting groups were well established in the field of the peptide synthesis. In the method of the present invention also, the protecting groups may be removed in accordance with these known procedures (e.g., treatment with HF, $CF_3COOH$, $HBr/CH_3COOH$ or the like or catalytic reduction along palladium black).

In accordance with the method of the present invention various peptides including any numbers of or any kinds of amino acid units can be produced. The peptides are exemplified by therapeutically valuable peptides such as oxytocin, vassoprescin, glucagon, ACTH (adrenocorticotropic hormone) and its analoges, secretin, calcitonin, insulin, gastrin, bradykinin, eledoisin, LH-RH (luteinizing hormone-releasing hormone), cyclic peptide antibiotics (e.g., penicillins, cephalosporins, etc. and its derivatives, TRH (thyrotropin releasing hormone), MIF (melanocyte stimulating hormone inhibiting factor), etc., as well as intermediates for the manufacture of such peptides.

The improved method of the present invention is characterized by the facts that:

1. The method is free from the racemization as well as the side reaction which accompanies the use of N-hydroxysuccinimide.
2. The desired peptide is produced fast in high yield.
3. The peptide formation reaction can be conducted in aqueous solution, because the N-hydroxy-5-norbornene-2,3-dicarboximide ester of an amino acid or peptide whose N-terminal group has been protected is stable and hydrolysisresistant to the extent that it is almost inconceivable for the known N-hydroximide esters.
4. In addition, the peptide can be obtained in high purity grades because N-hydroxy-5-norbornene-2,3-dicarboximide which is liberated upon formation of the peptide bond can be removed easily and completely from the reaction system due to its adequate solubility in water and in common solvents which are routinely used in peptide synthesis. It should also be noticed that N-hydroxy-5-norbornene-2,3-dicarboximide can be reclaimed in extremely high recovery yield.

The examples given hereinafter will further illustrate this invention. Unless otherwise specified, all the amino acids or amino acid residues used in these examples have the L-configuration. Further, the following abbreviations are used.

H—(Pyr)Glu—OH = pyroglutamic acid
H—Glu(OH)—OH = glutamic acid
H—Ala—OH = alanine
H—Gly—OH = glycine
H—Val—OH = valine
H—Phe—OH = phenylalanine
H—ILe—OH = isoleucine
H—Gln—OH = glutamine
H—Asn—OH = aspargine
H—His—OH = histidine
H—Trp—OH = trypsin
H—Arg—OH = arginine
H—Ser—OH = serine
H—Tyr—OH = tyrosine
H—Phe—OH = phenylalanine
H—Met—OH = methionine
H—Lys—OH = lysine
H—Orn—OH = ornithine
Z— = carbobenzoxy
BOC— = t-butyloxycarbonyl
—OMe = methyl ester
—OEt = ethyl ester
—OBzl = benzyl ester
—OtBu = t-butyl ester
—ONBI = N-hydroxy-5-norbornene-2,3-dicarboximide ester
—OPCP = pentachlorophenyl ester
IBOC— = isobornyloxycarbonyl
—ONP = p-nitrophenyl ester
HONBI = N-hydroxy-5-norbornene-2,3-dicarboximide
DCC = N,N'-dicyclohexylcarbodiimide
DMF = dimethylformamide
THF = tetrahydrofuran
TLC = thin layer chromatography In the thin layer chromatography, the following developing solvent systems are used.

Rf 1 — Chloroform-methanol-glacial acetic acid(9:1:0.5)
Rf 2 — Ethyl acetate-pyridine-acetic acid-water(60:20:6:11)
Rf 3 — n-Butanol-ethyl acetate-acetic acid-water(1:1:1:1:) Rf 4 — n-Butanol-acetic acid-water(4:1:1)
Rf 5 — n-Butanol-pyridine-acetic acid-water(30:20:6:24)

REFERENCE EXAMPLE

Preparation of N-hydroxy-5-norbornene-2,3-dicarboximide

In 120 ml. of water is dissolved 52.6 g. of hydroxylamine hydrochloride and, then, 41 g. of sodium carbonate is dissolved in the solution with constant shaking. To this solution is added 100 g. of 5-norbornene-2,3-dicarboxylic anhydride (the anhydride of 5-norbornene-2,3-dicarboxylic acid).

When the latter has been dissolved, the solution is heated on a water bath at 60°–70°C for 1 hour. After the reaction, the reaction mixture is allowed to stand in the cold overnight so that it is cooled well. The resulting crystals are recovered by filtration.(m.p.165.-5°–167°C; yield 98 percent). These crystals are dissolved in the smallest possible amount of tetrahydrofuran and, then, ester is added when hot. When crystals start emerging, the addition of ether is terminated and the system is allowed to stand in the cold. The crystals are recovered by filtration and washed with ether. Yield 92.6 g. (84.9 percent). m.p.167°–167.5°C (literature value: 165°–167°C)

EXAMPLE 1

Z—(Pyr)Glu—ONBI

In 200 ml. THF and 200 ml. dioxane, there is dissolved 24 g. (90mM) of Z—(Pyr)Glu—OH and, under cooling with ice, 17.8 g. of HONBI and 21 g. of DCC are added. The mixture is stirred under cooling with ice for 20 minutes and, then, at room temperature for 40 minutes, at the end of which time the byproduct dicyclohexylurea is filtered off. The filtrate is concentrated to dryness under reduced pressure, which leaves crystals.

These crystals are recrystallized from ethyl acetatepetroleum benzin, whereupon 36 g. (94 percent of needles are obtained. m.p.143.5°–144°C; $[\alpha]_D^{26} = -41.9°(c=0.2, \text{ethanol})$ Analysis for $C_{22}H_{20}O_7N_2$(424.40)
 Calcd. C, 62.26; H, 4.75; N, 6.60
 Found C, 62.47; H, 4.73; N, 6.55

EXAMPLE 2

Z—Glu(OtBu)—ONBI

To a solution of Z—Glu(OtBu—OH 16.82 g.(50mM) and HONBI 9.76g(55mM) in dioxane (200ml) is added DCC 11.35g(55mM) under cooling with ice. The mixture is stirred for 4 hours at room temperature, and the formed dicyclohexylurea is filtered off. The filtrate and washings are combined and evaporated to dryness under reduced pressure. The resulting oil is triturated with petroleum ether to give crystals which are collected by filtration and are recrystallized from ethyl acetate-petroleum ether to give fine needles. Yield,20.4g(82 percent). m.p.120°–121°C, $[\alpha]_D^{23}{32} -32.0°(cm0.96 \text{ in methanol})$.

Analysis for $C_{26}H_{30}O_8N_2$
 Calcd. C, 62.64; H, 6.07; N, 5.62.
 Found C, 62.81; H, 6.05; N, 5.78

EXAMPLE 3

Z—(Pyr)Glu—Glu(OBzl)—OH

In a mixture of 50 ml. dioxane and 40 ml. water, there is suspended 2.6 g. (1.1mM) of H—Glu(OBzl)—OH and, with the addition of 1.5 ml. triethylamine, the suspension is heated to obtain a solution.

The solution is rapidly chilled with ice-water and 3.4g. (8mM) crystals of Z—(Pyr)Glu—ONBI according to the Example 1 are added. The mixture is stirred at room temperature for 5 hours. The dioxane is distilled off under reduced pressure and 15 ml. of N-hydrochloric acid is added to the residue, followed by extraction with two 20 ml. portions of ethyl acetate. The ethyl acetate layer is washed twice with water, desiccated over anhydrous sodium sulfate and concentrated to dryness under reduced pressure. The residual crystals are treated with petroleum ether, recovered by filtration and dried, whereupon 3.6 g. (92.8 percent) of needles are obtained. m.p.127°–128°C; $[\alpha]_D^{21}=-17.9°(c=1.02, \text{ethanol})$.

Analysis for $C_{25}H_{26}O_8N_2$(482.47)
 Calcd. C, 62.23; H, 5.43; N, 5.81
 Found C, 62.21; H, 5.40; N, 5.81

EXAMPLE 4

Z—Ala—NH$_2$

In 30 ml. ethyl acetate and 40 ml. tetrahydrofuran, there are dissolved 4.5 g (20mM) of Z—Ala—OH and 3.6 g. of HONBI, and under cooling with ice, 4.5 g. of DCC is added. The mixture is stirred under cooling with ice for 30 minutes and, then, at room temperature for 30 minutes. The byproduct dicyclohexylurea is filtered off and 20 ml. of concentrated aqueous ammonia is added to the filtrate. The mixture is stirred under cooling with ice for 3 hours. The reaction mixture is concentrated to dryness under reduced pressure and the residue is dissolved by the addition of 150 ml. of ethyl acetate. The solution is washed with two 100 ml. portions of 1N-hydrochloric acid, washed with water, dehydrated over anhydrous sodium sulfate and concentrated to dryness under reduced pressure. The crystalline residue thus obtained is recrystallized from ethyl acetate-petroleum ether, whereupon 3.6 g. (81 percent) of needles are obtained. m.p.128°–129°C Analysis for $C_{11}H_{14}O_3N_2$(222.24)
 Calcd. C, 59.45; H, 6.35; N, 12.60
 Found C, 59.69; H, 6.25; N, 12.50

EXAMPLE 5

Z—Ala—Gly—OBzl

In 40 ml. ethyl acetate and 30 ml. tetrahydrofuran, there are dissolved 4.5 g. (20mM) of Z—Ala—OH and 3.6 g. of HONBI and, under cooling with ice, 4.5 g. of DCC is added. The mixture is stirred under cooling with ice for 30 minutes and at room temperature for 30 minutes. The byproduct dicyclohexylurea is filtered off and the residue is concentrated to dryness under reduced pressure. The oily residue is dissolved in a 1:1 mixture of ethyl acetate and petroleum ether and the insoluble urea is filtered off.

The filtrate is concentrated to dryness under reduced pressure and the residue is dissolved in 40 ml. dioxane, followed by the addition of 6.8 g (20mM) H—Gly—OBzl-p-toluenesulfonate and 3.0 ml. triethylamine. The mixture is stirred at room temperature for 4 hours and the reaction mixture is concentrated to dryness under reduced pressure. The residue is dissolved in 150 ml. ethyl acetate and the solution is washed with an aqueous solution of sodium hydrogen carbonate and, 1N-hydrochloric acid. After washing with water, it is dehydrated over anhydrous sodium sulfate and concentrated to dryness under reduced pressure. The crystalline residue is recrystallized from ethyl acetatepetroleum benzin, whereupon 6.62 g. (92.0 percent) of needles are obtained. m.p.109°–110°C(literature value 111°C)

Analysis for $C_{20}H_{22}O_5N_2$
 Calcd. C, 64.85; H, 5.99; N, 7.56
 Found C, 64.79; H, 5.93; N, 7.61

EXAMPLE 6

Z—Val—OBzl

In 30 ml. ethyl acetate and 30 ml. tetrahydrofuran, there are dissolved 5.0 g. (20mM) of Z—Val—OH and 3.6 g. of HONBI. Then, under cooling with ice, 4.5 g. of DCC is added. The mixture is stirred at 0°C for 30 minutes and, then, at room temperature for 1 hour. The byproduct urea is filtered off and the filtrate is concentrated to dryness under reduced pressure. The residue is dissolved in 40 ml. of tetrahydrofuran and, under cooling with ice, 7.6 g. (20mM) of H—Val—OBzl—p—toluenesulfonate and 2.9 ml. of triethylamine are added. The mixture is stirred under cooling with ice for 30 minutes and, then, at room temperature for 8 hours, at the end of which time it is concentrated to dryness under reduced pressure. The concentrate is dissolved in 150 ml. of ethyl acetate and the solution is washed with a 4 percent aqueous solution of sodium hydrogen carbonate and 1N-hydrochloric acid. After washing with water, it is dehydrated over sodium sulfate and concentrated to dryness under reduced pressure. Petroleum ether is added to the oily residue and the mixture is cooled whereupon crystals separate out. Recrystallization from ethyl acetate-petroleum ether gives 8.10 g. (92percent of needles. m.p.114°–116°C(literature value 116°C) $[\alpha]_D^{21}$=−44.2°($c$=2.06, methanol)(literature value −44.3°)

Analysis for $C_{25}H_{32}O_5N_2$
 Calcd. C, 68.16; H, 7.32; N, 6.36
 Found C, 67.76; H, 7.08; N, 6.47

EXAMPLE 7

Z—Gly—Phe—Gly—OEt (Anderson-Young test)

a. Preparation of stirring compound Z—Gly—Phe—OH

In 100 ml. of tetrahydrofuran are dissolved 8.4 g. (40mM) of Z—Gly—OH and 7.2 g. of HONBI and, under cooling with ice, 9 g. of DCC is added. The mixture is stirred at 0°C for 30 minutes and at room temperature for 1 hour. The byproduct dicyclohexylurea is filtered off and the residue is concentrated to dryness under reduced pressure. Meanwhile, 7.4 g. (45mM) of H—Phe—OH is dissolved in 80 ml. of DMF containing 40 percent water, followed by the addition of 3.7 g. of sodium hydrogen carbonate. To this solution is added the Z—Gly—ONBI prepared above and the mixture is stirred under cooling with ice for 1 hour and at room temperature for 4 hours. To the resulting reaction mixture, there are added 150 ml. of ethyl acetate and 50 ml. of 1N-hydrochloric acid, followed by washing with 100 ml. of a saturated aqueous solution of sodium chloride. The water layer is extracted with two 80 ml. portions of ethyl acetate. The ethyl acetate layer is washed with 100 ml. of 1N-hydrochloric acid and, after washing with water, dried over anhydrous sodium sulfate. The dehydrated liquid is then concentrated to dryness under reduced pressure, whereupon a crystalline residue is obtained. The crystals are treated with petroleum benzin and recrystallized from ethyl acetate-petroleum benzin. The procedure yields 14.2 g. (100 percent) of needles. m.p.125°–126°C(literature value 126°C) $[\alpha]_D^{21}$=+35.2°($c$=1.7, ethanol)(literature value $[\alpha]_D^{20}$=+33.9°, $c$=4.7, in ethanol)

Analysis for $C_{19}H_{20}O_5N_2$(356.37)
 Calcd. C, 64.03; H, 5.66; N, 7.86
 Found C, 64.01; H, 5.72; N, 7.90 b. Racemization test

In 10 ml. of DMF are dissolved 1.78 g. (5mM) of the Z—Gly—Phe—OH and 700 mg. (5mM) of H—Gly—OEt—hydrochloride. After the addition of 0.64 ml. of N-ethylmorpholine, the solution is cooled to −2°C. To this solution are added 1.1 g. (1.2 equivalents) of HONBI and 1.1 g. of DCC and the resulting mixture is stirred at −2°C for 1 hour, then at 5°C for 1 hour and finally at 20°C for 6 hours. Then, 100 ml. of ethyl acetate is added to the reaction mixture, which is then washed with a 4 percent aqueous solution of sodium hydrogen carbonate and 1N-hydrochloric acid. It is further washed with water, dehydrated and concentrated to dryness under reduced pressure. The crystalline residue is treated with petroleum ether and recovered. Yield 2.20 g. (100 percent); m.p.113°–115°C. $[\alpha]_D^{19}$=−12.2° ($c$=2.0, ethanol). One(1.0) gram of the above product is dissolved in 50 ml. of ethanol under heating and, then, a small amount of seed crystals of Z—Gly—DL—Phe—Gly—OEt is added. The system is allowed to stand at 2°C for 1 week, but no precipitation of DL-tryptophan is observed. The above solution is concentrated under reduced pressure to 20 ml. and, then, allowed to stand at 2°C, whereupon needles separate.

These crystals are recovered by filtration, 650 mg. m.p.116°–118°C: $[\alpha]_D^{19}$=−12.5°($c$=2.0, ethanol). It is evidently an optically pure L-compound. The filtrate is also concentrated under reduced pressure and ether is added to the concentrate. The resulting crystals are recovered by filtration. Yield 170 mg.; m.p.116°–118°C. $[\alpha]_D^{19}$=−12.3°($c$=2.0, ethanol). This product also is the L-compound. Total yield: 82 percent.

It is therefore concluded that no racemization occurs at all in the process of this invention.

When the above reaction is carried out by the same procedure except that HONBI is dispensed with, Z—Gly—DL—Phe—Gly—OEt is obtained in a yield of 7.05 percent, the reaction yield being 86 percent.

Further, when 20 ml. of tetrahydrofuran is used as a reaction solvent, the production of DL-peptide is not encountered, either, so far as HONBI is employed, but 5.05 percent of DL-peptide is produced in the absence of HONBI.

EXAMPLE 8

Racemization testt by synthesis of Z—Phe—ILe—Gly—OBzl a. Synthesis of the starting compound Z—Phe—ILe—OH In 40 ml. tetrahydrofuran and 20 ml. ethyl acetate, there are dissolved 6.0 g. (20mM) of Z—Phe—OH and 3.6 g. of HONBI and, under cooling with ice, 4.4 g. of DCC is added.

The mixture is stirred under cooling with ice for 30 minutes and, then, at room temperature for 1 hour. The byproduct urea is filtered off and the filtrate is concentrated to dryness under reduced pressure, dissolved in 20 ml. of tetrahydrofuran and cooled. Meanwhile, 2.88 g. (22mM) of H—ILe—OH is dissolved in a mixture of 30 ml. DMF and 22 ml. 1N-aqueous solution of sodium hydroxide and, under cooling with ice, the above solution of Z—Phe—ONBI is added. The mixture is stirred under cooling with ice for 1 hour and at room temperature for 6 hours, followed by the addition of 30 ml. of 1N-hydrochloric acid and 60 ml. of a saturated aqueous solution of sodium chloride. Then, the mixture is extracted with three 100 ml. portions of ethyl acetate. The ethyl acetate layer is washed twice with water, dehydrated and concentrated to dryness under reduced pressure. The crystalline residue is treated with petroleum ether and recrystallized from ethyl acetate-petroleum ether, whereupon 7.80 g. (94 percent) of needlets are obtained. m.p.152°–154°C; $[\alpha]_D^{21}$=−1.6°($c$=1.06, ethanol)

Analysis for $C_{23}H_{28}O_5N_2$(412.47)
 Calcd. C, 66.97; H, 6.84; N, 6.79

Found C, 66.95; H, 6.89; N, 6.79 b. Synthesis of Z—Phe—ILe—Gly—OBzl (racemization test)

In 20 ml. of DMF are dissolved 1.03 g. (2.5mM) of Z—Phe—ILe—OH and 840 mg.(2.5mM) of H—Gly—OBzl—p—toluenesulfonate, followed by the addition of 0.32 ml.(2.5mM) of N-ethylmorpholine and 540 mg. (1.2 equivalents) of HONBI. Then, under cooling with ice, 600 mg. of DCC is added. The mixture is stirred under cooling with ice for 2 hours and, then, at room temperature for 4 hours, after which time 100 ml. of water is added. The reaction mixture is extracted with two 80 ml. portions of ethyl acetate and the ethyl acetate layer is washed with a 4 percent aqueous solution of sodium hydrogen carbonate and 1N-hydrochloric acid. After washing with water, the product is dehydrated and concentrated to dryness under reduced pressure. The crystalline residue is treated with petroleum benzin and recovered by filtration. 1.52 g. (100 percent). This product is hydrolyzed with 5.7N–HCl at 110°C for 20 hours for amino acid analysis.

Phe, 0.96; Ile, 0.98; allo-ILe, 0.0048; Gly, 1.00

The D-compound formed in the course of this reaction is not more than 0.7 percent. On the other hand, the above reaction is carried out under the same conditions as above except that HONBI is dispensed with. Yield 1.28 g. (84 percent); amino acid analysis: Phe, 0.93; ILe, 0.62; allo-ILe, 0.34; Gly, 1.00. The proportion of the D-compound formed in this instance is as high as 30 percent.

EXAMPLE 9

Z—Gln—Ala—OBzl

In 30 ml. dioxane-40 ml. DMF are dissolved 5.6 g. (20mM) of Z—Gln—OH and 7.05 g.(20mM) of H—Ala—OBzl—p—toluenesulfonate and, after the addition of 2.8 ml. triethylamine, the solution is cooled with ice. Then, 4 g. of HONBI and 4.2 g. of DCC was added. The mixture is stirred under cooling with ice for 1 hour and, then, at room temperature for 5 hours, after which time the byproduct dicyclohexylurea is filtered off. The dioxane is distilled off and 150 ml. of water is added to the residue, whereupon crystals immediately separate out. These crystals are recovered by filtration and recrystallized from ethanol. The procedure yields 8.0 g. (90.5percent) of needles, m.p.188°-189°C.

Analysis for $C_{23}H_{27}O_6N_3$

Calcd. C, 62.75; H, 6.16; N, 9.52

Found C, 62.72; H, 6.20; N, 9.38

EXAMPLE 10

Z—Asn—Gly—OEt

In 40 ml. of DMF are dissolved 2.7 g. (10mM) of Z—Asn—OH and 1.4 g. (10mM) of H—Gly—O-Et—hydrochloride and, under cooling with ice, 1.4 ml. of triethylamine and 2 g. of HONBI are added. Then, 21 g. of DCC is further added. The mixture is stirred under cooling with ice for 1 hour and, then, at room temperature overnight. The byproduct dicyclohexylurea is filtered off and, after the addition of cold water in an amount approximately twice that of DMF, the mixture is left standing in a refrigerator. The resulting crystals are recovered by filtration and recrystallized from ethanol.

The procedure yields 3.26 g. (92 percent) of needles, m.p.184°-185°C. (Literature value 184°C).

Analysis for $C_{16}H_{21}O_6N_3$

Calcd. C, 54.69; H, 6.02; N, 11.96

Found C, 54.63; H, 6.11; N, 12.04

EXAMPLE 11

H—(Pyr)Glu—Glu—Ala—$NH_2$

In 60 ml. of methanol is dissolved 1.11 g. (5mM) of Z—Ala—$NH_2$ and the solution is subjected to hydrogenolysis using palladium black as a catalyst for 3 hours. The catalyst is filtered off and the residue is concentrated to dryness under reduced pressure. The residue thus obtained and Z—(Pyr)Glu—Glu(OBzl)—OH (prepared in Example 2; 2.41 g. or 5mM) are dissolved in 30 ml. tetrahydrofuran 10 ml. DMF and the resulting solution is cooled to 0°C. To this solution are added 1 g. of HONBI and 1.1 g. of DCC. The mixture is stirred at 0°C for 2 hours and, then, at room temperature for 6 hours, after which time the tetrahydrofuran is distilled off. The urea is removed by filtration and, then, 50 ml. of ether and 40 ml. of ethyl acetate are added to the filtrate, whereupon crystals separate out. These crystals are recovered by filtration and recrystallized from methanol. The procedure yields 2.41 g. (87 percent) of Z—(Pyr)Glu—Glu(OBzl)—Ala—$NH_2$, m.p.212°-214°C. $[\alpha]_D^{21}=-27.9°(c=1.05$, glacial acetic acid)

Analysis for $C_{28}H_{32}O_8N_4$(552.57)

Calcd. C, 60.86; H, 5.84; N, 10.14

Found C, 60.78; H, 5.67; N, 10.16

The above product Z—(Pyr)Glu—Glu—(OBzl)—Ala—$NH_2$ (2g.) is dissolved in 40 ml. of glacial acetic acid and the resulting solution is subjected to catalytic reduction with palladium black for 5 hours. The catalyst is filtered off and the filtrate is concentrated to dryness under reduced pressure, whereupon needles separate out. After the addition of methanol, the crystals are recovered by filtration and washed with cold methanol. Yield 1.05 g.

Analysis for $C_{13}H_{20}O_6N_4$

Calcd. C, 47.55; H, 6.14; N, 17.07

Found C, 47.17; H, 6.11; N, 17.00

In paper-chromatographic assay, this product shows at Rf 5=0.37 a single spot which gives positive peptide reactions.

EXAMPLE 12

Z—(Pyr)Glu—His—OH

In 50 ml. dioxane-40 ml. water-20 ml. DMF, there are dissolved 3.6 g. (24mM) of H—His—OH—hydrochloride and 2.5 g. (24mM) of sodium carbonate (anhydrous) under heating. The solution is rapidly cooled and 8.49 g. (20mM) of Z—(Pyr)Glu—ONBI is added. The mixture is stirred under cooling with ice for 30 minutes and at room temperature for 4 hours, after which time the dioxane is distilled off under reduced pressure. Then, precisely 24 ml. of 1N-hydrochloric acid is added to the residue, followed by washing with 2 portions of ethyl acetate. The water layer is concentrated under reduced pressure to about 20 ml. and, then, this concentrate is allowed to stand in a refrigerator overnight. The columnar crystals that have separated out are recovered by filtration and washed with cold water. Yield 6.9 g. (86 percent). The crystals are further recrystallized from water containing a small amount of methanol. Yield 6.67 g. (78 percent). m.p.146°-147° C(decomp.) $[\alpha]_D^{21}=-6.4°(c=1.12$, methanol)

Analysis for $C_{19}H_{20}O_6N_4 \cdot 1.5H_2O$
Calcd. C, 53.42; H, 5.42; N, 13.11
Found C, 53.50; H, 5.23; N, 13.02

EXAMPLE 13

H—(Pyr)Glu—His—Pro—$NH_2$ (i.e.,TRH).

In 30 ml. of DMF is dissolved 2.15 g. (5mM) of Z—(-Pyr)Glu—His—OH, which is described in Example 11, together with H—Pro—$NH_2$[To prepare this material, 1.25 g. (5mM) of Z—Pro—$NH_2$ is catalytically reduced in 50 ml. of methanol using palladium black and, after removal of the catlayst, the filtrate is concentrated to dryness under reduced pressure]. Then, 1 g. of HONBI is added. The mixture is cooled to 0°C and, then, 1.1 g. of DCC is added.

The mixture is stirred at 0°C for 2 hours and, then, at room temperature overnight, after which time the byproduct dicyclohexylurea is filtered off. Then, the DMF is removed by distillation under high vacuum. The residue is triturated with 30 ml. of ether and the ether is removed. The residue is dissolved in 20 ml. of chloroform and the solution is run onto a column packed with 60 g. of silica gel. The column is washed with 300 ml. of 5 percent methanol-chloroform and, then, eluted with 20 percent methanol-chloroform. The 20 percent methanol-chloroform fraction is concentrated to dryness under reduced pressure and the residue is treated with ether and recovered by filtration. The procedure yields 2.4 g. (96 percent) of Z—(Pyr)-Glu—His—Pro—$NH_2$ as a white powder.

In TLC assays this product gives single spots which react positively to Pauli's reagent (at Rf3=0.43 and at Rf=0.10 as developed with chloroform-methanol=6:1).

The above product (2 g.) is dissolved in 40 ml. of methanol and the solution is subjected to catalytic reduction with palladium black for 4 hours. The catalyst is filtered off and the methanol is distilled off under reduced pressure.

The residue is treated with 30 ml. of ethyl acetate, recovered by filtration and dried. The above procedure yields 1.45 g. (quantitative) of a sample of synthetic TRH which is in complete agreement with an authentic sample of TRH. $[\alpha]_D^{23}=-42.0°(c=1.0$, methanol) $[\alpha]_D^{23}=-43.2°(c=0.6$, acetic acid)
Amino acid analysis: Glu, 0.98; His, 1.00; Pro, 1.00.
Paper chromatography(n-butanol-acetic acid-pyridine-water=30:6:20:24), Rf=0.40

EXAMPLE 14

Production of β(1-24) corticotropin

In 20 ml. of DMF is dissolved 1.6 g. (1mM) of Z—Ser—Tyr—Ser—Met—Glu(OtBu)—His—Phe—Arg—Trp—Glu—OH—p—toluenesulfonate and while the solution is cooled with ice, 270 mg. of HONBI and 240 mg. of DCC are added. The mixture is stirred under cooling with ice for 1 hour and at room temperature for 4 hours. An additional 240 mg. of DCC is added to the reaction mixture, followed by stirring at room temperature overnight.

Then, 40 ml. of ethyl acetate and 80 ml. of ether are cooled and added to the reaction mixture and the resulting crystals are recovered by filtration and washed with 50 ml. of ethyl acetate. Meanwhile, 2.28 g. (1mM) of BOC—Lys(Z)—Pro—Val—Gly—Lys(Z)—Lys(Z)-—Arg($NO_2$)—Arg($NO_2$)—Pro—Val—Lys(-Z)—Val—Tyr—Pro—OH [prepared by the procedure described in Chem. Pharm.Bull., 18, 1,288(1970)] is dissolved in 30 ml. of trifluoroacetic acid under cooling with ice and the solution is stirred at 10°C for 25 minutes, whereby the substituent group BOC is removed.

Then, ether is added and the resulting precipitate is recovered by filtration and dried. The resulting powder is dissolved in 25 ml. of DMF and, after the addition of 0.28 ml. of N-ethyl-morpholine, the solution is cooled with ice. To this solution, there is added the first-mentioned precipitate and the system is stirred under cooling with ice for 30 minutes and, then, at room temperature for 8 hours. To the reaction mixture is added 120 ml. of oxide-free ether and the resulting precipitate is recovered by filtration. After drying, it is reprecipitated from 10 percent water-methanol, whereupon 3.7 g. of crude protected tetracosapeptide is obtained. This product is treated with anhydrous hydrogen fluoride in the per se conventional manner to remove the protective groups and, after removal of hydrogen fluoride by distillation, it is treated with Amberlite IRA-400 (acetate-form) to obtain a crude preparation of β(1-24) corticotropin acetate. Then, it is purified by the conventional column chromatography on carboxymethyl-cellulose in a gradient solution system of ammonium acetate solutions (from 0.01 to 0.4 mole). After lyophilization, β(1-24) corticotropin is obtained in an overall yield of 30-40 percent, the titer of which is 95 to 120 I.U. as assayed by tracing the depression of adrenal ascorbic acid level. $[\alpha]_D^{21}=-84.0±2°$ ($c=0.5$, 1 percent acetic acid)

In paper electrophoresis and paper chromatography, this product gives a single, coherent spot each, which gives positive reactions in Ehrlich, ninhydrin, Pauli and Sakaguchi tests. Amino acid analysis (hydrolyzed in 5.7N-HCl at 105°C for 24 hours): His, 1.00; Lys, 4.08; Arg, 3.10; Glu, 1.02; Ser, 1.89; Gly, 2.00; Pro, 2.95; Val, 3.00; Met, 0.89; Tyr, 1.97; Phe, 1.00.

EXAMPLE 15

LH-RH related compounds (I)

1. Z—(Pyr)Glu—His—Trp—OBzl

In 60 ml. of dimethylformamide are dissolved 4.27 g. (10mM) of Z—(Pyr)Glu—His—OH, 4.66 g. (10mM) of H—Trp—OBzl—p—toluenesulfonate and 1.38 ml. of N-ethyl-morpholine. The solution is cooled to 0°C and 3 g. of HONBI and 3.1 g. of dicyclohexylcarbodiimide are added. The mixture is stirred at 0°C for 2 hours and, then, at room temperature for 6 hours. The byproduct dicyclohexylurea is filtered off and the filtrate is concentrated to dryness under reduced pressure. Ether is added to the residue and the resulting powder is recovered by filtration and washed with ethyl acetate. This powder is dissolved in 20 ml. of 5 percent methanol-chloroform and the solution is run onto a column (500 ml.) of silica gel which has been washed with the same solvent. The column is washed with 1.2-liter of 5 percent methanol-chloroform and, then, the tripeptide is eluted with chloroform containing 15 percent methanol. The solvent is distilled off under reduced pressure and the residue is treated with ether, recovered by filtration, washed with ether and finally dried. Yield 5.82 g. (86 percent).

Analysis for $C_{37}H_{36}O_7N_6 \cdot 2H_2O$
Calcd. C, 62.35; H, 5.66; N, 11.79
Found C, 62.54; H, 5.82; N, 11.43

In TLC assays on silica gel, this product gives a single spot each at Rf4=0.64 and at Rf3=0.79, both spots giving positive Ehrlich and Pauli reactions. There is no evidence of impurities.

2. H—(Pyr)Glu—His—Trp—Ser—Tyr—Gly—OtBu

In 50 ml. of methanol is dissolved 3.40 g. (5mM) of Z—(Pyr)Glu—His—Trp—OBzl and the solution is subjected to catalytic reduction with palladium black for 4 hours. The catalyst is filtered off and the methanol is evaporated under reduced pressure. Meanwhile, 2.60 g. (5mM) of Z—Ser—Tyr—Gly—OtBu is dissolved in 80 ml. of methanol and the solution is subjected to catalytic reduction with palladium black catalyst for 3 hours. The catalyst is removed by filtration and the filtrate is concentrated to dryness under reduced pressure, whereupon crystals are obtained. The two materials obtained above are dissolved in 50 ml. of dimethylformamide and, then, 1.1 g. of HONBI is added, followed by cooling with water. To this solution is added 1.30 g. of dicyclohexyl-carbodiimide and the mixture is stirred under cooling with ice for 3 hours and at room temperature for 6 hours. The byproduct dicyclohexylurea is filtered off and the filtrate is concentrated under reduced pressure. Ether is added to the concentrate and the resulting precipitate is recovered by filtration, washed well and dried. While the resulting powder may be directly subjected to the next reaction, it may be purified by column-chromatography on silica gel (solvent system: ethyl acetate-pyridine-acetic acid-water=30:20:6:10), evaporating the solvents under reduced pressure and washing the residue with ether, or alternatively by the steps of heating it in ethanol, adding ethyl acetate, cooling the mixture and recovering the resulting crystals by filtration. Yield 3.10 g. (75 percent); TLC; Rf2=0.42; amino acid analysis: Glu, 1.00; His, 0.94; Ser. 0.96; Tyr, 1.01; Gly, 1.01; Trp (UV) 1.03

3. Z—Arg ($NO_2$)—Pro—Gly—$NH_2$

In 100 ml. of dimethylformamide is dissolved 24.8 g. of Z—Arg($NO_2$)—Pro—OH and, under cooling at 0°C. 10.7 g. of HONBI and 12.3 g. of DCC are added. The mixture is stirred for 6 hours, at the end of which time the byproduct dicyclohexylurea is removed by filtration. The filtrate is cooled and 7.3 g. of H—Gly—$NH_2$.—acetate and 7.7 ml. of triethylamine are added. The mixture is stirred for 8 hours. The dimethylformamide is distilled off under reduced pressure and n-butanol is added. The mixture is then washed with a saturated aqueous solution of sodium chloride. The n-butanol layer is distilled under reduced pressure and ether is added, whereupon powder is obtained. Reprecipitation from ethanol-ether yields 26.5 g. (96 percent) of the desired compound, m.p.100°-116°C (Being a particulate product, it shows no distinct melting point, it decomposes.)

Analysis for $C_{21}H_{30}O_7N_8$
 Calcd. C, 49.79, H, 5.97; N, 22.12
 Found C, 49.81; H, 6.12; N, 21.75

4. Z—Leu—Arg($NO_2$)—Pro—Gly—$NH_2$

In 25 ml. of 25 percent HBr-glacial acetic acid, there is dissolved 3.5 g. (7mM) of the Z—Arg($NO_2$)—Pro—Gly—$NH_2$. The solution is shaken for 40 minutes and, then, 200 ml. of dry ether is added. The resulting precipitate is recovered by filtration,, washed with ether and dried. The powder thus obtained is dissolved in a mixture of 20 ml. dimethylformamide and 20 ml. of dioxane, followed by the addition of 1.4 ml. triethylamine. Meanwhile, 2.12 g. (8mM) of Z—Leu—OH and 1.6 g. of HONBI are dissolved in 20 ml. ethyl acetate-20 ml. tetrahydrofuran and, under cooling with ice, 1.7 g. of DCC is added. The mixture is stirred under cooling with ice for 30 minutes and, then, at room temperature for 2 hours, after which time the byproduct urea compound is filtered off. The filtrate is concentrated to dryness under reduced pressure and the residue is dissolved in 10 ml. of dioxane. This solution is added to the above amine compound solution and the resulting mixture is stirred overnight. Then, the reaction mixture is concentrated under reduced pressure to remove the dioxane, followed by the addition of water. The mixture is washed with 2 portions of ethyl acetate and the water layer is extracted with n-butanol (100 ml.×3). The n-butanol layer is washed with water, concentrated to dryness under reduced pressure, washed with ether and filtered. Yield 3.8 g.; m.p.135°-153°C (decomp.; no distinct melting point).

Analysis for $C_{27}H_{41}O_8N_9$
 Calcd. C, 52.33; H, 6.66; N, 20.34
 Found C, 52.41; H, 6.83; N, 19.97

TLC: The above product gives a single spot each of Rf1=0.16 and Rf2=0.66, both spots giving positive peptide reactions.

5. Z—Lys(IBOC)—Pro—Gly—$NH_2$

In 50 ml. of acetonitrile are dissolved 11.8 g. of Z—Lys(IBOC)—OH dicylcohexylamine salt and 3.6 g. of H—Pro—OMe hydrochloride and, under cooling with ice, 4.5 g. of DCC is added. The mixture is stirred for 10 hours and, then, the byproduct dicyclohexylurea is removed by filtration. The filtrate is concentrated under reduced pressure and 150 ml. of ethyl acetate is added to the concentrate, whereupon an additional small amount of urea compound separates out. These precipitate is filtered off. The ethyl acetate solution is washed with a 4 percent aqueous solution of $NaHCO_3$ and 0.1N—HCl and, after washing with water, dried over anhydrous sodium sulfate. Removal of the solvent by distillation leaves 9.8 g. of an oily residue. This oil is dissolved in 40 ml. of methanol and 20 ml. of 1N-sodium hydroxide is added. The solution is stirred for 1 hour to saponify the ester and, after neutralization with 22 ml. of 1N—HCl, extracted with 100 ml. of ethyl acetate, washed with water and dried over anhydrous sodium sulfate. The ethyl acetate is removed by distillation to obtain 5.9 g. of an oily residue. This oil (5 g.) is dissolved in 15 ml. of dimethylformamide and, under cooling with ice, 1.35 ml. of triethylamine and 4.45 g. of trichloroacetic acid pentachlorophenyl ester are added. The mixture is stirred at room temperature for 50 minutes. Then, 1.34 g. of H—Gly—$NH_2$—acetate and 1.5 ml. of triethylamine are added to the above reaction mixture, followed by stirring for 8 hours. Ether is added and the resulting precipitate is recovered by filtration and reprecipitated from ethanolether. Yield 3.5 g.; m.p.90°-91°C(decomp.); $[\alpha]_D^{21}$=−20.0° (c=0.5, methanol)

6. Z—Leu—Lys(IBOC)—Pro—Gly—$NH_2$

In 50 ml. of methanol is dissolved 3.0 g. of the Z—Lys—(IBOC)—Pro—Gly—$NH_2$ and the solution is subjected to catalytic reduction with palladium black catalyst.

After 4 hours of hydrogenolysis, the catalyst is filtered off and the methanol is removed by distillation. The residue is dissolved in 15 ml. of dimethylformamide and 2.8 g. of Z—Leu—OPCP is added. The mixture is stirred for 8 hours, after which time the solvent is distilled off under reduced pressure and ether is added. The resulting powder is recovered by filtration, washed with ether and reprecipitated from ethanol-ether.

Yield 3.0 g. (82.6 percent); m.p.124°-125°C-(decomp.); $[\alpha]_D^{21}=-44.2°$ ($c=0.5$, methanol)

Analysis for $C_{38}H_{58}O_8N_6$

Calcd. C, 62.78; H, 8.04; N, 11.56

Found C, 62.64; H, 8.20; N, 11.39

7. BOC—Leu—Orn(Z)—Pro—Gly—NH₂

In 50 ml. of dioxane is dissolved 6.5 g. of IBOC—Orn(Z)—OH and, under cooling with ice, 1.8 g. of N-hydroxysuccinimide and 3.1 g. of DCC are added. The mixture is stirred for 6 hours. The byproduct dicyclohexylurea is filtered off and 2.5 g. of H—Pro—OMe—hydrochloride is added to the filtrate. Then, 2.2 ml. of triethylamine is added. The mixture is stirred at room temperature for 10 hours, after which time the solvent is distilled off under reduced pressure.

The residue is dissolved in 150 ml. of ethyl acetate, washed with 4 percent sodium hydrogen carbonate and 0.1N—HCl, washed with water and finally dried over anhydrous sodium sulfate.

The oil (7.0 g.) obtained upon removal of the ethyl acetate is dissolved in 20 ml. of methanol and saponified by the addition of 12.5 ml. of 1N-sodium hydroxide under cooling with ice. The mixture is stirred at room temperature for 60 minutes and, then, neutralized with 1N-hydrochloric acid. It is extracted with three 50 ml. portions of ethyl acetate and washed with water. The ethyl acetate layer is dehydrated and, then, concentrated to dryness under reduced pressure, whereupon 2 g. of an oil is obtained. This oil (1.5 g.) is dissolved in 10 ml. of trifluoroacetic acid and deisobornyloxycarbonylated for 30 minutes. Ether is added to the reaction mixture and the resulting precipitate is recovered by filtration and washed with ether. The resulting powder is dissolved in 10 ml. of dimethylformamide and, under cooling at 0°C, 0.6ml. of triethylamine and, then, 1.04 g. of BOC—Leu—OPCP are added. The mixture is stirred at room temperature for 10 hours. The dimethylformamide is removed under reduced pressure and the residue is extracted with ethyl acetate. The extract is washed with 0.1N—HCl and water, dried and distilled under reduced pressure to remove the solvent. The resulting oily residue is dissolved in 10 ml. of dimethylformamide and, under cooling with ice, 368 mg. of HONBI, 420 mg. of DCC and 290 mg. of H—Gly—NH₂—hydro—bromide are added. Then, 0.26 ml. of N-ethylmorpholine is further added and the mixture is stirred for 8 hours. The dimethylformamide is distilled off under reduced pressure and the residue is dissolved in ethyl acetate. The solution is washed with 0.1N-hydrochloric acid and 4 percent sodium hydrogen carbonate. After washing with water, the solution is dehydrated and concentrated to dryness under reduced pressure. The residue is treated with petroleum benzin and filtered to obtain a powder. Yield 740 mg.(62 percent); m.p93°-95°C(decomp.); $[\alpha]_D^{21}=-33.0°$ ($c=0.5$, methanol).

8. H—(Pyr)Glu—His—Trp—Ser—Tyr—Gly—Leu—Arg—Pro—Gly—NH₂

In 50 ml. of glacial acetic acid is dissolved 1.86 g. (3mM) of the Z—Leu—Arg(NO₂)—Pro—Gly—NH₂ and the solution is subjected to catalytic reduction with palladium black for 20 hours. To the reaction mixture is added 7 ml. of 1N—HCl—glacial acetic acid, followed by concentration to dryness under reduced pressure. The residue is desiccated well over sodium hydroxide. Meanwhile, 2.50 g. (3mM) of the H—(Pyr)—Glu—His—Trp—Ser—Tyr—Gly—OtBu is dissolved in 20 ml. of trifluoroacetic acid (containing 0.1 ml. of mercapto-ethanol and 3 ml. of 1N—HCl—glacial acetic acid) and the solution is allowed to stand in nitrogen streams at room temperature for 50 minutes.

At a reduced temperature, the trifluoroacetic acid is distilled off under reduced pressure and ether is added to the residue. The resulting precipitate is recovered by filtration, washed well with ether and desiccated over sodium hydroxide. The above two dry powders are dissolved in 50 ml. of dimethylformamide and, then, 0.75 ml. of N-ethylmorpholine and 600 mg. of HONBI are added. Then, at 5°C, 700 mg. of DCC is added. The mixture is stirred at 5°C for 2 hours and, then, at room temperature overnight. The byproduct dicyclohexylurea is filtered off and the dimethylformamide is distilled off under reduced pressure, followed by the addition of 50 ml. ether. The resulting powder is recovered by filtration and dissolved in 0.05M-aqueous ammonium acetate. The solution is run onto a column of Amberlite XAD-II(200–250 mesh) and eluted in a gradient elution system of 0.05M-aqueous solution of ammonium acetate and 80 percent ethanol. The desired LH—RH emerges in the neighborhood of 50 percent ethanol concentration. These fractions are pooled and concentrated under reduced pressure. After removal of the ethanol, the residue is lyophilized, whereupon 2.21 g. of a chromatographically homogeneous sample of the hormone is obtained as a genuine-white powder. $[\alpha]_D^{21}=-43°$ to $49°$($c=0.5$, 1 percent acetic acid; variable to some extent according to the degree of drying). Paper chromatography(Toyo Roshi No.50): Rf5=0.70 to 0.72

Paper electrophoresis (Toyo Roshi No.50): pH 6.5, pyridineacetic acid, 500V, 3 hours: Rf(Arg)=0.58 to 0.60 The product gives a single spot which gives positive Ehrlich, Sakaguchi and Pauli tests.

Amino acid analysis: His, 0.98; Arg, 0.97; Glu, 1.00; Ser, 0.96; Pro, 1.08; Gly, 2.00; Leu, 1.03; Tyr, 1.02; Trp(by UV), 1.08.

When rats are dosed with this product by the subcuteneous route, ovulation is induced at the dose of 40 μg. per 100 g. body weight; by the intravenous route, at the dose of 20 μg.

In 2-liter of distilled water for injections there are dissolved 100 mg. of this product and 200 g. of mannitol, and the solution is filtered through a bacteria-free membrane filter and dispensed into 1 ml. ampoules, followed by drying in a lyophilizer. The procedure yields preparations containing 50 μg. of LH—RH per ampoule.

9. H—(Pyr)Glu—His—Trp—Ser—Tyr—Gly—Leu—Lys—Pro—Gly—NH₂

In 20 ml. of methanol is dissolved 500 mg. of the Z—Leu—Lys(IBOC)ᵋ—Pro—Gly—NH₂ and the solution subjected to catalytic reduction with palladium black. The catalyst is filtered off and the methanol is distilled off, followed by the addition of ether to the residue. The precipitate is recovered by filtration, whereupon 400 mg. of H—Leu—Lys—(IBOC)—Pro—Gly—NH₂ is obtained. This powder (188 mg.) is dissolved in 3 ml. of dimethylformamide and under cooling at 0°C, there are added 240 mg. of H—(Pyr)-Glu—His—Trp—Ser—Tyr—Gly—OH—HCl, 0.084 ml. of triethylamine, 80.6 mg. of DCC and 70.2 mg. of HONBI. The mixture is stirred at 0°C for 4 hours and at room temperature for 8 hours. The byproduct dicyclohexylurea is filtered off and ethyl acetate is added to the filtrate. The precipitate formed thereupon is recovered by filtration. Yield 270 mg. A TLC assay of this product shows evidence of contaminants. So, it is purified by chromatography using a column of Amberlite XAD-II(2.4×19cm) in a gradient elution system of 0.05M-ammonium acetate 5 to 70 percent ethanol. The active fractions are pooled, concentrated under reduced pressure to remove the ethanol and lyophilized. The procedure yields 147 mg. of a pure sample.

This product (100 mg.) is stirred with 3 ml. of trifluoroacetic acid containing 0.1 ml. of anisol and concentrated to dryness under reduced pressure. The concentrate is washed with ether and dissolved in water. The solution is passed through a column of Amberlite IRA-400(acetate-form) to obtain the corresponding acetate, which is then lyophilized.

Yield 88 mg.; $[\alpha]_D^{21}=-55.4°(c=0.5,$ 5 percent acetic acid)

Paper chromatography: Rf5=0.51

Amino acid analysis: Lys, 0.96; His, 1.04; Ser, 0.85; Glu, 1.00; Pro, 1.00; Gly, 2.00; Leu, 1.00; Tyr, 1.04; Trp(UV), 0.98.

10. H—(Pyr)Glu—His—Trp—Ser—Tyr—Gly—Leu—Orn—Pro—Gly—NH₂

In 5 ml. of 50 percent trifluoroacetic acid-dichloromethane is dissolved 380 mg. of the BOC—Leu—Orn(Z)—Pro—Gly—NH₂ and the solution is stirred at room temperature for 40 minutes. The reaction mixture is concentrated in dryness under reduced pressure and 1 ml. of 3N—HCl—glacial acetic acid is added. It is then treated with ether and the resulting powder is recovered by filtration. The procedure yields 280 mg. of H—Leu—Orn(Z)—Pro—Gly—HCl.

This product (170 mg.) is dissolved in 3 ml. of dimethylformamide and, under cooling with ice, 240 mg. of H—(Pyr)—Gly—His—Trp—Ser—Tyr—Gly—OH—HCl, 0.084 ml. of triethylamine and 64.4 mg. of HONBI are added. Then, 74.2 mg. of DCC is added and the mixture is stirred at 0°C for 2 hours and at room temperature for 8 hours. The byproduct dicyclohexylurea is filtered off and 20 ml. of ethyl acetate is added to the filtrate. The resulting precipitate is recovered by filtration and dried. Yield 290 mg. A 280 mg. portion of the above product is caused to absorb on a column (2.4×19cm) of Amberlite XAD-II and desorbed in a gradient elution system of 5 percent ethanol and 70 percent ethanol.

The [Orn(Z)]⁸-LH-RH fractions are pooled and distilled under reduced pressure to remove the ethanol, followed by lyophilization. The procedure yields 170 mg. of a pure sample. A 150 mg. portion of this [Orn(Z)]-LH-RH sample is dissolved in 20 ml. of methanol and, after the addition of 1 ml. acetic acid, the solution is subjected to catalytic hydrogenolysis with palladium black. After 6 hours of hydrogenolysis, the catalyst is filtered off and the filtrate is concentrated to dryness under reduced pressure. The residue is dissolved in water and lyophilized. Yield 120 mg.; $[\alpha]_D^{21}=-61.0°(c=0.5,$ 5 percent acetic acid); paper chromatography: Rf5=0.51.

Amino acid analysis: His, 1.09; Orn, 1.05; Ser, 0.93; Glu, 0.93; Pro, 0.93; Gly, 1.90; Leu, 1.01; Tyr, 0.93; Trp(UV), 0.97.

EXAMPLE 16

LH-RH related compounds (II)

1. IBOC—Gly—Arg(NO₂)—Pro—Gly—NH₂

In 5 ml. of dimethylformamide are dissolved 1.8 g. of IBOC—Gly—OH and 1.76 g. of p-nitrophenol. Under cooling with ice, 1.6 g. of DCC is added and the mixture is stirred overnight. The byproduct dicyclohexylurea is filtered off to obtain a solution of IBOC—Gly—ONP. Meanwhile, 1.8 g. of Z—Arg(NO₂)—Pro—Gly—NH₂ is treated by a procedure similar to that described above to prepare a Z-free powdery product, which is then dissolved in 5 ml. of DMF. Under cooling with ice, 0.6 ml. of triethylamine is added and, then, the above IBOC—Gly—ONP is added. The mixture is stirred overnight. Ether is added to the reaction mixture and the resulting precipitate is recovered by filtration and reprecipitated from ethyl acetate-ether. Yield 1.8 g. (82 percent); m.p.129°–131°C (decomp.); Rf1=0.6.

Analysis for C₂₆H₄₃O₈N₉.H₂O

Calcd. C, 49.73; H, 7.22; N, 20.09

Found C, 49.93; H, 7.13; N, 19.34

2. Z—Phe—Arg(NO₂)—Pro—Gly—NH₂

Z—Arg(NO₂)—Pro—Gly—NH₂(0.50g., 1mM) is treated in the same manner as the above Example 15 (6) to obtain a powder of H—Arg—(NO₂)—Pro—Gly—NH₂.HBr. This product is dissolved in 5 ml. of dimethylformamide, followed by the addition of 0.30 g. (1mM) of Z—Phe—OH and 0.18 g. (1mM) of HONBI. Then, 0.15 ml. of triethylamine is added. The mixture is cooled to 0°C and 0.22 g. of DCC is added. The entire mixture is stirred for 8 hours. The byproduct urea is filtered off and the dimethylformamide is removed by distillation under reduced pressure. Ethyl acetate and ether are added to the residue and the resulting precipitate is recovered by filtration. Yield 0.50g. (90 percent).

This product shows a single spot which gives positive peptide reactions at Rf1=0.20.

Z—Ala—Arg(NO₂)—Pro—Gly—NH₂

Z—Arg(NO₂)—Pro—Gly—NH₂ is treated by a procedure similar to that described in Example 15 (6) to obtain H—Arg—(NO₂)—Pro—Gly—NH₂ which, in turn, is condensed with Z—Ala—OH by the N-hydroxysuccinimide process. The reaction mixture is treated with ether and the resulting precipitate is reprecipitated from chloroform-ethyl acetate. The procedure yields Z—Ala—Arg(NO₂)—Pro—Gly—NH₂ (84.8 percent).

In a TLC assay, this product shows a single spot which gives positive peptide reactions at Rf1=0.10.

4. IBOC—Val—Arg(NO₂)—Pro—Gly—NH₂

Z—Arg(NO₂)—Pro—Gly—NH₂ (450 mg.) is treated with 25 percent hydrogen bromide-glacial acetic acid under stirring for 50 minutes and the reaction mixture is treated with ether. The resulting precipitate, H—Arg(NO₂)—Pro—Gly—NH₂.HBr salt, is dissolved in 5 ml. of dimethylformide, followed by the addition of 0.14 ml. of N-ethylmorpholine. Then, IBOC—Val—ONBI(synthesized from 320 mg. of IBOC—Val—OH) is added and the mixture is stirred at room temperature for 2 days. Ether is added to the reaction mixture and the resulting precipitate is recovered by filtration and dissolved in chloroform. The solutionis washed with 4 percent sodium hydrogen carbonate and water and the chloroform layer is dehy- 5. Z—ILe—Arg(NO₂)—Pro—Gly—NH₂

This product is prepared in the same manner as above (1) from H—Arg(NO₂)—Pro—Gly—NH₂, which is obtainable by treatment of Z—Arg(NO₂)—Pro—Gly—NH₂ with hydrogen bromideglacial acetic acid, and Z—ILe—ONBI. The above procedure yields a pure sample of the tetrapeptide derivative (yield: 77.0 percent) which gives single spots at Rf1=0.17 and at Rf2=0.68.

6. H—(Pyr)Glu—His—Trp—Ser—Tyr—Gly—Gly—Arg—Pro—Gly—NH₂

H—(Pyr)Gly—His—Trp—Ser—Tyr—Gly—OtBu(488 mg.) is treated with 0.5 ml. of 5N—HCl and 10 ml. of trifluoroacetic acid containing glacial acetic acid in the conventional manner to cleave the t-butyl ester, whereupon the free compound is obtained as a dry powder. Meanwhile, 366 mg. of IBOC—Gly—Arg-(NO₂)—Pro—Gly—NH₂ is dissolved in 2 ml. of trifluoroacetic acid and, after stirring for 30 minutes, 0.1 ml. of 6.67N—HCl—dioxane is added. The mixture is concentrated under reduced pressure and ether is added. The resulting precipitate is recovered by filtration and dried. This and the first-mentioned powders are dissolved in 5 ml. of dimethylformamide and, then, 0.17 ml. of triethylamine, 129 mg. of HONBI and 148.6 mg. of DCC are added. The mixture is stirred for 24 hours. The dicyclohexylurea which has separated out is filtered off and the dimethylformamide is removed by distillation under reduced pressure. Ethyl acetate is added to the residue and the resulting precipitate is recovered by filtration and reprecipitated from ethanol-ethyl acetate. Yield 1.0 g. This [Gly⁷, Arg(NO₂)⁸]—LH—RH (150 mg.) is wetted with 0.1 ml. of anisole and 0.05 ml. of mercaptoethanol and, then, dissolved in 10 ml. of dry hydrogen fluoride. The solution is stirred under cooling for 60 minutes. The hydrogen fluoride is distilled off and the residue is dessiccated over sodium hydroxide. The dried residue is dissolved in water and extracted with ether. The extract is passed through a column of Amberlite IRA–400 (acetate-form) and, then, chromatographed using a column of Amberlite XAD-II.

The active fractions are pooled, concentrated under reduced pressure and dried. The procedure yields 107 mg. of [Gly⁷]—LH—RH. $[\alpha]_D^{20}=-40.0\pm4°(c=1.0,$ 5 percent acetic acid) Amino acid analysis: Ser, 0.91; Glu, 0.87; Pro, 0.93; Gly, 3.00; Tyr, 1.01; His, 1.10; Arg, 1.15; Trp(UV), 1.03

Analysis for $C_{51}H_{64}O_{12}N_{17}\cdot 3CH_3COOH\cdot 8H_2O$
Calcd. C, 48.92; H, 6.63; N, 17.02
Found C, 48.70; H, 6.39; N, 16.92

7. H—(Pyr)Glu—His—Trp—Ser—Tyr—Gly—Phe—Arg—Pro—Gly—NH₂

The Z—Phe—Arg(NO₂)—Pro—Gly—NH₂ is subjected to catalytic reduction with palladium black in the conventional manner, whereby substituent group Z is removed. The resulting H—Phe—Arg—Pro—Gly—NH₂·2HCl(92.1 mg.) and (Pyr)Glu—His—Trp—Ser—Tyr—Gly—OH—HCl are dissolved in 12 ml. of dimethylformamide, followed by the addition of 36 mg. of HONBI and 0.44 ml. of 10 percent N-ethylmorpholine-dimethylformamide. Then, at 0°C, 41 mg. of DCC is added. The mixture is stirred at 0°C for 4 hours. and, then, at room temperature for 8 hours. The reaction mixture is treated with 15 ml. ethyl acetate and the resulting precipitate is recovered by filtration, washed with ethyl acetate dried and dissolved in water. The insolubles are filtered off and the filtrate is run onto a column (1.5×22cm) of Amberlite XAD-II. The desired product is desorbed in a gradient elution system of 5 percent ethanol to 70 percent ethanol. The [Phe⁷]—LH—RH fractions are pooled and the ethanol is distilled off. Lyophilization of the residue yields 82 mg. of a pure sample of the desired compound. Amino acid analysis: His, 0.93; Arg, 0.93; Ser, 0.97; Glu, 1.00; Pro, 1.03; Gly, 2.00; Tyr, 1.00; Phe, 0.97; Trp(by UV), 0.98.

8. H—(Pyr)Glu—His—Trp—Ser—Tyr—Gly—Ala—Arg—Pro—Gly—NH₂

This compound is prepared from the Z—Ala—Arg-(NO₂)—Pro—Gly—NH₂ and (Pyr)Glu—His—Trp—Ser—Tyr—Gly—OtBu by a procedure similar to that described in the above (7). The product is further purified by chromatography using a column of carboxymethyl-cellulose (in a gradient elution system of 0.005 to 0.1 mole of ammonium phosphate buffer, pH 6.8). $[\alpha]_D^{21}=-48.2°$ ($c=0.35$, 5 percent acetic acid); paper chromatography, Rf5=0.55. Amino acid analysis: His, 0.94; Arg, 1.00; Ser, 1.00; Glu, 1.00; Pro, 1.06; Gly, 2.00; Ala, 1.06; Tyr, 1.00; Trp(UV), 1.06.

9. H—(Pyr)Glu—His—Trp—Ser—Tyr—Gly—Val—Arg—Pro—Gly—NH₂

This product is prepared from the IBOC—Val—Arg-(NO₂)—Pro—Gly—NH₂ and (Pyr)Glu—His—Trp—Ser—Tyr—Gly—OH by a procedure similar to that described in the above (6). $[\alpha]_D^{21}=-47.8°$ ($c=0.56$, 5 percent acetic acid); paper chromatography, Rf5=0.57. Amino acid analysis: His, 1.06; Arg, 0.93; Ser, 0.94; Glu, 1.00; Pro, 0.94; Gly, 2.06; Val, 0.94; Tyr, 1.03; Trp(UV), 1.08.

10. H—(Pyr)Glu—His—Trp—Ser—Tyr—Gly—ILe—Arg—Pro—Gly—NH₂

Using Z—IL3—Arg(NO₂)—Pro—Gly—NH₂, this compound is synthesized by the same procedure as the above (7). $[\alpha]_D^{21}=-84.0(c=0,5$, 5 percent acetic acid); Paper chromatography, Rf5=0.52; Amino acid analysis for His, 1.04; Arg, 1.00; Ser, 0.97; Glu, 0.89; Pro, 0.92; Gly, 1.89; ILe, 1.08; Tyr, 1.00; Trp(UV), 1.01.

What is claimed is:

1. In a method for producing a peptide which comprises allowing an amino acid or peptide whose N-terminal amino or imino group has been protected to react with an N-hydroximide compound in the presence of a carbodiimide reagent to produce an N-hydroximide ester of an amino acid or peptide whose N-terminal group is protected and allowing thus produced N-hydroximide ester to react with an amino acid, peptide or derivative thereof whose N-terminal amino or imino group is free and optionally liberating the protected peptide into the free form, with the proviso that:
   1. if the amino acid or peptide whose N-terminal amino or imino group has been protected has free functional group or groups in side chain, none, some or all of these functional group or groups are protected, and
   2. if the amino acid or peptide derivative whose N-terminal amino or imino group is free has free functional group or groups in side chain or/and a C-terminal carboxyl group, none, some or all of these groups are protected, the improvement wherein 2,3N-hydroximide compound is N-hydroxy-5-norbornene-a-dicarboximide.

2. A method as claimed in claim 1, wherein the objective peptide is L-pyroglutamyl-L-histidyl-L-proline amide.

3. A method as claimed in claim 1, wherein the objective peptide is L-pyroglutamyl-L-bistidyl-L-tryptophyl-L-seryl-L-tyrosyl-glycyl-L-leucyl-L-arginyl-L-prolyl-glycine amide.

4. A method for producing -Lpyroglutamyl-L-histidyl-L-proline amide, which comprises condensing a mixture containing N-carbobenzyloxy-L-pyroglutamyl-L-histidine, L-proline amide and N-hydroxy-5-norbornene-2,3-dicarboximide, by contacting said mixture with a carbodiimide reagent to produce N-carbobenzyloxy-L-pyroglutamyl-L-histidyl-L-proline amide and removing the carbobenzyloxycarbonyl group from the product.

5. A method for producing L-pyroglutamyl-L-histidyl-L-tryptophyl-L-seryl-L-tyrosyl-glycyl-L-leucyl-L-arginyl-L-prolyl-glycine amide, the ω-guanidine group or arginine being unprotected or protected by nitro, which comprises condensing a mixture containing L-pyro-glutamyl-L-histidyl-L-tryptophyl-L-seryl-L-tyrosyl-glycine, L-leucyl-L-arginyl-L-prolyl-glycine amide, the ω-guanidine group of arginine being unprotected or protected by nitro, and N-hydroxy-5-norbornene-2,3-dicarboximide, by contacting said mixture with a carbodiimide reagent.

* * * * *